United States Patent Office 3,526,636
Patented Sept. 1, 1970

3,526,636
IMIDAZOISOINDOLES
William J. Houlihan, Mountain Lakes, N.J., assignor to Sandoz-Wander, Inc., Hanover, N.J., a corporation of Delaware
No Drawing. Filed Jan. 16, 1968, Ser. No. 698,143
Int. Cl. C07d 49/34, 49/36
U.S. Cl. 260—309          11 Claims

ABSTRACT OF THE DISCLOSURE

This disclosure is directed to 5-substitutedphenylimidazo[2,1-a]isoindoles, e.g., 5 - (3,4 - dichlorophenyl) - 5H-imidazo[2,1-a]isoindole. These compounds are useful as central nervous system stimulants. Certain of the compounds may be prepared by reducing a corresponding isoindole-5-one, and treating the resulting imidazoisoindole with a lower alkanoic acid.

---

This invention relates to novel heterocyclic compounds. In particular, this invention pertains to 5-substitutedphenyl imidazo isoindoles, to acid addition salts thereof, and to methods for preparing them. These imidazo isoindoles may be represented by formula (Z)

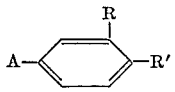

where A represents (a)

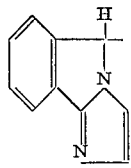

in which event R and R', independently represent H, halo having an atomic weight of about 19–36, or trifluoromethyl, provided only one of R and R' represents trifluoromethyl at one time, and provided further that at least one of R and R' represents other than H, (b)

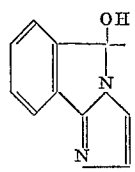

in which event R and R', independently represent H or halo having an atomic weight of about 19–36, provided at least one of R and R' represents said halo, or (c)

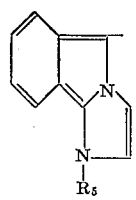

in which event R is H and R', represents H or halo having an atomic weight of about 19–36, and $R_5$ is a straight chain loweralkyl group.

Certain of the imidazoisoindoles of the present invention may be represented by the structural formula

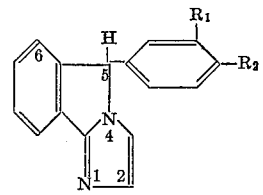

where each of $R_1$ and $R_2$, independently, represent H, halo having an atomic weight of about 19–36 or trifluoromethyl, provided only one of $R_1$ and $R_2$ represents trifluoromethyl at one time, and provided further that at least one of $R_1$ and $R_2$ represents other than H.

The above compounds (I) may be prepared by treating a compound of the formula

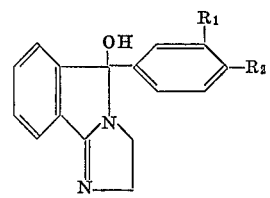

(or an acid addition salt thereof, where $R_1$ and $R_2$ are as previously indicated, with a lower alkanoic acid such as acetic acid, propionic acid and butyric acid for about 3–12 hours at a temperature of about 100–165° C., preferably 115–120° C. No solvent is necessary since excess acid solubilizes the imidazoisoindole (II). The particular temperature utilized is not critical in the obtaining of the compounds of Formula I. The resulting products are recovered according to conventional recovery techniques such as evaporation, crystallization, and the like. If the acid addition salts of the compounds of Formula I are desired, they may be obtained by salification of the free base.

According to an additional aspect of this invention, there are obtained compounds of the formula

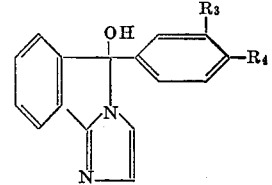

where each of $R_3$ and $R_4$, independently, represent H or halo having an atomic weight of about 19–36, provided at least one of $R_3$ and $R_4$ represents said halo.

These compounds (III) are obtained from the corresponding compounds of Formula I wherein each of $R_1$ and $R_2$, independently, represent H or said halo. For convenience these starting materials used in preparation of the compounds of Formula III may be represented by formula

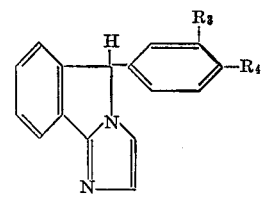

where $R_3$ and $R_4$ are as defined above.

The above mentioned process for preparing the compounds of Formula III comprises treating in solvent compounds of Formula Ia with a non-reducing metallic base and free oxygen. The non-reducing metallic base is a base which would avoid reduction of the final product (III) and may be exemplified by the alkali metal hydrides such as sodium hydride, potassium hydride, and lithium hydride, or the alkali metal amides such as sodium amide, lithium amide and potassium amide. The free oxygen may be supplied as air or as gaseous oxygen. The solvent useful in accordance with this process includes preferably inert amides, e.g., dimethylformamide, diethylformamide, and the like. The isoindoles of Formula III are obtained when the reaction is conducted at a temperature of about 20°–100° C., preferably 25°–50° C. Neither the particular temperature nor solvent utilized is critical in obtaining the products (III). The resulting imidazoisoindoles (III) are recovered utilizing conventional recovery techniques. When it is desired to obtain the acid addition salt from the free base, the latter is salified.

According to a still further aspect of the present invention, there are obtained compounds of the formula

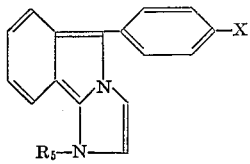

(IV)

where $R_5$ is a straight chain loweralkyl group, particularly a straight chain loweralkyl group having 1–3 carbon atoms, viz., methyl, ethyl and propyl, and X represents halo having an atomic weight of about 19–36. These compounds are obtained by treating the corresponding 1-unsubstituted imidazoisoindole, e.g., 5-(4-chlorophenyl)-5H-imidazo[2,1-a]isoindole, with a straight chain loweralkyl halide, such as a straight chain loweralkyl halide wherein the halogen has an atomic weight of about 80–127, particularly bromo and iodo, e.g., methyl bromide, ethyl bromide, and methyl iodide, at a temperature of from about 15°–105° C., preferably about 20°–40° C. The product (IV) is recovered utilizing conventional recovery techniques such as chromatography and crystallization.

The starting compounds (II) are prepared by chemically reducing a corresponding isoindole-5-one

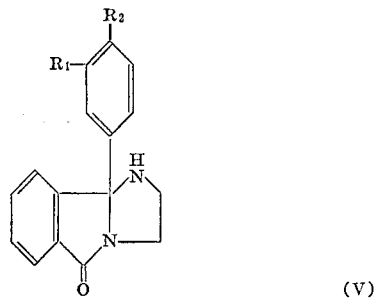

(V)

where $R_1$ and $R_2$ are as defined above, in an inert solvent, e.g., tetrahydrofuran and diethyl ether, employing lithium aluminum hydride, at a temperature which should not exceed about 45° C. preferably, the reaction temperature is in the range of from about 15° C. to about 35° C. This process is carried out under inert atmospheres, e.g., nitrogen gas, generally for about 6 to 96 hours and the intermediate product obtained is of the formula

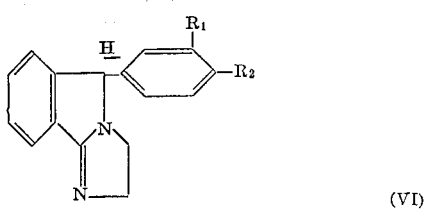

(VI)

where $R_1$ and $R_2$ are as previously defined. The starting compounds (II) are obtained from the compounds of Formula VI by allowing the isoindoles (VI) to come in contact with air, e.g., by standing at room temperature in an open vessel for from 2–10 days. However, it is more desirable to accelerate the reaction and this can be readily accomplished by bubbling air or oxygen into a solution of isoindole (VI) in solvent, preferably loweralkanol, e.g., methanol or ethanol. In this manner, appreciable yields of the desired product are obtained within about 4 hours. The compounds (II) are recovered using conventional techniques.

The compounds of Formula II may be also prepared from the compounds of Formula V by treating the latter at a temperature not exceeding about 45° C., preferably 15–35° C. with lithium aluminum hydride in an inert ether solvent such as tetrahydrofuran and then treating the processed reaction product with air or oxygen in an inert solvent. The temperature of reaction is critical in the obtaining of the imidazoisoindole (II).

Various of the compounds defined by Formula V employed in the above process and their preparation have been described in the literature (see, e.g., Netherlands Pat. No. 6,501,647, published Aug. 12, 1965). Such others are not specifically described in the literature can be prepared from available materials in an analogous manner.

The imidazo[2,1-a]isoindoles represented by Formulas I, III and IV are useful because they possess pharmacological properties in animals. In particular, these compounds are useful as central nervous system stimulants and can be used as anti-depressants as indicated by their activity in mice given a dosage of from about 50 to about 100 mg./kg. of active ingredient and tested using a 30-word adjective check sheet method basically as described by S. Irwin (Gordon Research Conference, Medicinal Chemistry, 1959) and Chen (Symposium on Sedative and Hypnotic Drugs, Williams and Wilkins, 1954).

When so utilized, the compounds may be combined with one or more pharmaceutically acceptable carriers or adjuvants. They may be administered orally or parenterally and, depending upon the compound employed and the mode of administration, the exact dosage utilized may vary.

Furthermore, the compounds of Formulas I and III may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like.

In general, satisfactory results are obtained when these compounds are administered at a daily dosage of about 2 milligrams to about 100 milligrams per kilogram of animal body weight. This daily dosage is preferably administered 2 to 4 times a day, or in sustained release form. For most large mammals, the total daily dosage is from about 200 milligrams to about 800 milligrams. Dosage forms suitable for internal use comprise from about 50 milligrams to about 400 milligrams of the active compound in intimate admixture with a solid or liquid pharmaceutically acceptable carrier or diluent.

A representative formulation suitable for oral administration is a tablet prepared by standard tabletting techniques which contains the following.

| Ingredient: | Parts by weight |
|---|---|
| 5-(4-chlorophenyl)-5-hydroxy-2,3-dihydro-5H-imidazo[2,1-a]isoindole | 30 |
| Tragacanth | 2 |
| Lactose | 59.5 |
| Corn starch | 5 |
| Talcum | 3 |
| Magnesium stearate | 0.5 |

EXAMPLE 1

5-(3,4-dichlorophenyl)-5H-imidazo[2,1-a]isoindole

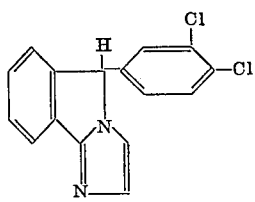

To a flask equipped with a stirrer, thermometer, dropping funnel, condenser and gas inlet tube, and blanketed with nitrogen, is added 250 ml. of dry tetrahydrofuran and 2.6 g. (0.068 mole) of lithium aluminum hydride. The mixture is stirred and then a solution of 20.0 g. (0.063 mole) of 9b-3,4-dichlorophenyl)-1,2,3,9b-tetrahydro-5H-imidazo[2,1-a]isoindol-5-one in 500 ml. of anhydrous tetrahydrofuran is added dropwise such that the temperature of the reaction mixture does not exceed 30° C. The resulting mixture is stirred for 6 hours at room temperature, then cooled in an ice bath and then treated with 5.2 ml. of 2 N sodium hydroxide and 7.8 ml. of water. The resulting mixture is filtered and the filtrate dried by the addition of solid anhydrous sodium sulfate. The sodium sulfate is then filtered off and the filtrate evaporated in vacuo on a rotary evaporator. The residue is crystallized from methanol-tetrahydrofuran (1.1) to obtain 5 - (3.4-dichlorophenyl)-5-hydroxy-2,3-dihydro-5H-imidazo[2,1-a]isoindole, M.P. 200°–201° C.

A solution of 5.0 g. 5-3,4-dichlorophenyl)-5-hydroxy-2,3-dihydro-5H-imidazo[2,1-a]isoindole and 50 ml. acetic acid is stirred and refluxed for six hours. The acetic acid is removed in vacuo and the residue taken up in benzene, washed with 50 ml. of 2 N sodium hydroxide, 50 ml. water and dried over sodium sulfate. The solvent is removed in vacuo and the residue crystallized from diethyl ether-pentane (1:1) to give 5-(3,4-dichlorophenyl)-5H-imidazo[2,1-a]isoindole; M.P. 112°–114° C.

EXAMPLE 2

5-(4-chlorophenyl)-5H-imidazo[2,1-a]isoindole

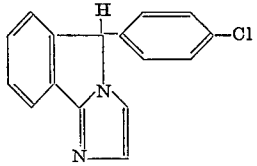

A solution of 3.5 g. of 5-(4-chlorophenyl)-5-hydroxy-2,3-dihydro-5H-imidazo[2,1-a]isoindole and 35 ml. of acetic acid is stirred and refluxed for eight hours. The acetic acid is removed in vacuo and the residue taken up in benzene, washed with 25 ml. of 2 N sodium hydroxide and 25 ml. of water and dried over sodium sulfate. The solvent is removed in vacuo and the residue crystallized from ether-pentane (1:1) to provide 5-(4-chlorophenyl)-5H-imidazo[2,1-a]isoindole; M.P. 108°–110° C.

EXAMPLE 3

5-(4 - trifluoromethylphenyl)-5H-imidazo[2,1-a]isoindole

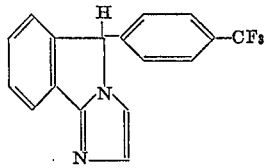

A solution of 2.9 g. of 5-(4-trifluoromethylphenyl)-5-hydroxy-2,3-dihydro-5H-imidazo[2,1-a]isoindole and 30 ml. of acetic acid is stirred and refluxed for six hours. The acetic acid is removed in vacuo and the residue taken up in benzene, washed with 25 ml. of sodium hydroxide and 25 ml. of water and dried over sodium sulfate. The solvent is removed in vacuo and the residue crystallized from diethylether-pentane (1:1) to give 5-(4-trifluoromethylphenyl)-5H-imidazo[2,1-a]isoindole; M.P. 105°–106° C.

EXAMPLE 4

5-hydroxy-5-p-chlorophenyl-5H-imidazo[2,1-a]isoindole

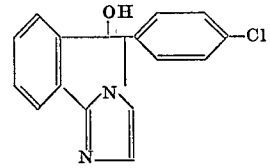

A solution of 20.0 g. (0.075 mole) 5-(4-chlorophenyl)-5H-imidazo[1,2-a]isoindole, 5.0 g. (0.115 mole sodium hydride) of a 55% sodium hydride mineral oil suspension and 1000 ml. of dimethylformamide is stirred at room temperature and continuously gassed with a stream of air for about twenty-four hours. The solvent is removed in vacuo and the residue treated with chloroform and then water. The chloroform extract is washed with a saturated sodium chloride solution, water and dried with sodium sulfate. The salts are filtered off and the solvent removed in vacuo. The residue is crystallized from tetrahydrofuran-ether (1:1) to give 5-hydroxy-5-p-chlorophenyl - 5H - imidazo[2,1-a]isoindole; M.P. 175°–177° C.

EXAMPLE 5

5-hydroxy-5-(3,4-dichlorophenyl)-5H-imidazo[2,1-a]isoindole

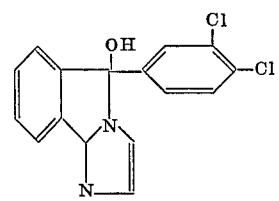

A solution of 16.0 g. (0.053 mole) of 5-(3,4-dichlorophenyl-5H-imidazo[2,1-a]isoindole, 2.8 g. of a 55% sodium hydride mineral oil suspension (0.062 mole of sodium hydride) and 500 ml. of dimethylformamide is stirred at room temperature and continually gassed with a stream of air for about forty-eight hours. The solvent is removed in vacuo and the residue treated with chloroform. The chloroform extract is washed first with saturated sodium chloride solution and then with water and dried with sodium sulfate. The salts are filtered off and the solvent removed in vacuo. The residue is crystallized from tetrahydrofuran-methanol (1:1) to give 5-hydroxy-5-(3,4-dichlorophenyl)-5H-imidazo[2,1-a]isoindole; M.P. 291°–292° C.

EXAMPLE 6

1-methyl-5-p-chlorophenyl-1H-imidazo[2,1-a]isoindole

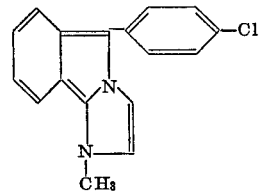

A solution of 10.0 g. 5-(4-chlorophenyl-5H-imidazo[2,1-a]isoindole and 150 ml. methyl iodide is stirred at room temperature for about fifteen hours. The excess methyl iodide is removed in vacuo and the residue chromatographed on silica gel. The column is eluted with chloroform and crystallized from tetrahydrofuran-ether (1:1) to give 1-methyl-5-p-chlorophenyl - 1H - imidazo[2,1-a]isoindole; M.P. 135°–138° C.

What is claimed is:
1. A compound of the formula

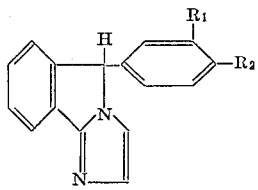

or a pharmaceutically acceptable acid addition salt thereof, where each of $R_1$ and $R_2$, independently, represent H, halo having an atomic weight of about 19–36, or trifluoromethyl, provided only one of $R_1$ and $R_2$ represents trifluoromethyl at one time, and provided further that at least one of $R_1$ and $R_2$ is other than H.

2. The compound of claim 1 which is 5-(3,4-dichlorophenyl)-5H-imidazo[2,1-a]isoindole.

3. The compound of claim 1 which is 5-(4-chlorophenyl)-5H-imidazo[2,1-a]isoindole.

4. The compound of claim 1 which is 5-(4-trifluoromethylphenyl)-5H-imidazo[2,1-a]isoindole.

5. A process for preparing the compound of claim 1 in free base form which comprises treating a compound of the formula

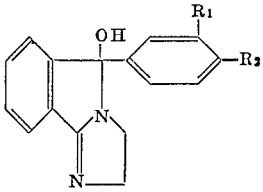

where each of $R_1$ and $R_2$, independently, represent H, halo having an atomic weight of about 19–36, or trifluoromethyl, provided only one of $R_1$ and $R_2$ represents trifluoromethyl at one time, and provided further that at least one of $R_1$ and $R_2$ represents other than H with a loweralkanoic acid at a temperature of about 100°–165° C.

6. A compound of the formula

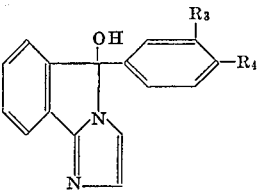

and pharmaceutically acceptable acid addition salts thereof, where each of $R_3$ and $R_4$, independently, represents H or halo having an atomic weight of about 19–36, provided at least one of $R_3$ and $R_4$ represents said halo.

7. The compound of claim 6 which is 5-hydroxy-5-p-chlorophenyl-5H-imidazo[2,1-a]isoindole.

8. The compound of claim 6 which is 5-hydroxy-5-(3,4-dichlorophenyl)-5H-imidazo[2,1-a]isoindole.

9. A process for preparing a compound according to claim 6 in free base form which comprises treating in solvent a compound of the formula

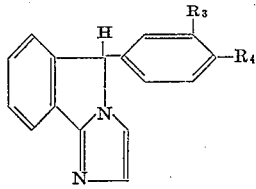

where each of $R_3$ and $R_4$, independently, represent H or halo having an atomic weight of about 19–36, provided at least one of $R_3$ and $R_4$ represents said halo, with a non-reducing metallic base and free oxygen at a temperature of about 20°–100° C.

10. A compound of the formula

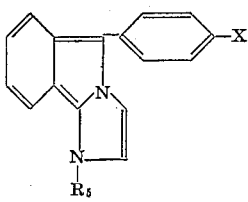

where $R_5$ represents straight chain loweralkyl, and X represents halo having an atomic weight of about 19–36.

11. The compound of claim 10 which is 1-methyl-5-p-chlorophenyl-1H-imidazo[2,1-a]isoindole.

References Cited

UNITED STATES PATENTS

| | | | |
|---|---|---|---|
| 2,004,864 | 6/1935 | Graenacher et al. | 260—309.2 |
| 2,404,299 | 7/1946 | Kyrides | 260—309 |
| 2,847,417 | 8/1958 | Erner | 260—309 |

OTHER REFERENCES

Betrabet et al., Chem. Abst., vol. 25, pp. 701–2 (1931).
Geigy, Chem. Abst., vol. 64, columns 6664–5 (1966).
Glushkov et al., Chem. Abst., vol. 63, cols. 13258–9 (1965).
Houdry Process Corporation, Imidazoles, p. 10 relied on, Philadelphia, Houdry Process Corporation, 1959.
Merck, Chem. Abst., vol. 63, cols. 18097–8 (1965).
Shirley et al., Jour. Amer. Chem. Soc., vol. 79, pp. 4922–7 (1957).

HENRY R. JILES, Primary Examiner
N. TROUSOF, Assistant Examiner

U.S. Cl. X.R.
260—309.6, 309.7; 424—273